(12) United States Patent
Xiong et al.

(10) Patent No.: US 9,483,176 B2
(45) Date of Patent: Nov. 1, 2016

(54) METHOD AND APPARATUS TO REDUCE DISPLAY LAG OF SOFT KEYBOARD PRESSES

(71) Applicant: SAMSUNG DISPLAY CO., LTD., Yongin, Gyeonggi-Do (KR)

(72) Inventors: Wei Xiong, Mountain View, CA (US); Frank Seto, San Jose, CA (US)

(73) Assignee: Samsung Display Co., Ltd., Yongin (KR)

( * ) Notice: Subject to any disclaimer, the term of this patent is extended or adjusted under 35 U.S.C. 154(b) by 329 days.

(21) Appl. No.: 14/303,457

(22) Filed: Jun. 12, 2014

(65) Prior Publication Data

US 2015/0012868 A1    Jan. 8, 2015

Related U.S. Application Data

(60) Provisional application No. 61/843,890, filed on Jul. 8, 2013.

(51) Int. Cl.
  *G06F 3/0486*    (2013.01)
  *G06F 3/0488*    (2013.01)
  *G06F 3/14*      (2006.01)
  (Continued)

(52) U.S. Cl.
  CPC .............. *G06F 3/04886* (2013.01); *G06F 3/14* (2013.01); *G06F 3/147* (2013.01); *G09G 5/363* (2013.01); *G09G 2320/0252* (2013.01); *G09G 2340/10* (2013.01); *G09G 2340/12* (2013.01); *G09G 2354/00* (2013.01); *G09G 2380/00* (2013.01)

(58) Field of Classification Search
  CPC .................................................. G06F 3/04886
  USPC .......................................................... 715/773
  See application file for complete search history.

(56) References Cited

U.S. PATENT DOCUMENTS

| 5,627,567 A | * | 5/1997 | Davidson | G06F 3/0488 345/170 |
| 6,073,036 A | * | 6/2000 | Heikkinen | G06F 3/04842 379/354 |

(Continued)

FOREIGN PATENT DOCUMENTS

| JP | 2004-364214 | 12/2004 |
| WO | WO 2012/044870 A2 | 4/2012 |
| WO | WO 2012/075197 A2 | 6/2012 |

OTHER PUBLICATIONS

EPO Search Report dated Dec. 1, 2014, for corresponding European Patent application 14176201.3, (8 pages).

*Primary Examiner* — Reza Nabi
(74) *Attorney, Agent, or Firm* — Lewis Roca Rothgerber Christie, LLP

(57) ABSTRACT

A method of indicating a selected at least one of keys on a keyboard of a display device, the keyboard having a layout including a plurality of keys, the method including identifying the selected at least one of the keys based on a location of the selected at least one of the keys on the keyboard of the display device, updating a rendered video frame with a stored image of the selected at least one of the keys to generate an updated video frame indicating the selection of the at least one of the keys for displaying by the display device, the stored image of the selected at least one of the keys corresponding to the selected at least one of the keys, and while another video frame indicating the selection of the at least one of the keys is being rendered, displaying the updated video frame by the display device.

29 Claims, 7 Drawing Sheets

US 9,483,176 B2
Page 2

(51) Int. Cl.
*G06F 3/147* (2006.01)
*G09G 5/36* (2006.01)

(56) References Cited

U.S. PATENT DOCUMENTS

| | | | | |
|---|---|---|---|---|
| 6,573,844 B1 * | 6/2003 | Venolia | G06F 3/04886 | 341/22 |
| 6,883,985 B2 * | 4/2005 | Roberson | B41J 5/14 | 341/22 |
| 6,962,454 B1 * | 11/2005 | Costello | G06F 3/0202 | 400/692 |
| 7,346,689 B1 * | 3/2008 | Northcutt | G06F 15/173 | 709/219 |
| 7,443,316 B2 * | 10/2008 | Lim | G06F 3/0237 | 341/22 |
| 8,289,286 B2 * | 10/2012 | Stallings | G06F 3/04886 | 345/173 |
| 8,390,572 B2 * | 3/2013 | Marsden | G06F 3/04886 | 345/168 |
| 8,471,825 B2 * | 6/2013 | Miyazaki | G06F 3/044 | 345/156 |
| 8,564,555 B2 * | 10/2013 | Day | G06F 3/0416 | 178/18.01 |
| 8,725,443 B2 * | 5/2014 | Uzelac | G06F 3/044 | 702/79 |
| 9,092,134 B2 * | 7/2015 | Figura | G06F 3/04886 | |
| 9,323,449 B2 * | 4/2016 | Chen | G06T 11/80 | |
| 2003/0189551 A1 * | 10/2003 | Olsen | G06F 3/0238 | 345/168 |
| 2004/0160419 A1 * | 8/2004 | Padgitt | G06F 3/04886 | 345/173 |
| 2004/0178994 A1 * | 9/2004 | Kairls, Jr. | G06F 3/0418 | 345/173 |
| 2007/0152978 A1 * | 7/2007 | Kocienda | G06F 3/04886 | 345/173 |
| 2009/0319935 A1 * | 12/2009 | Figura | G06F 3/0237 | 715/773 |
| 2010/0277505 A1 * | 11/2010 | Ludden | G06F 3/0416 | 345/634 |
| 2010/0333011 A1 * | 12/2010 | Kornev | G06F 3/04886 | 715/773 |
| 2011/0050576 A1 * | 3/2011 | Forutanpour | G06F 3/0488 | 345/168 |
| 2011/0221693 A1 * | 9/2011 | Miyazaki | G06F 3/0236 | 345/173 |
| 2014/0313144 A1 * | 10/2014 | Seto | G06F 3/041 | 345/173 |
| 2015/0012868 A1 * | 1/2015 | Xiong | G06F 3/04886 | 715/773 |
| 2015/0277653 A1 * | 10/2015 | Xiong | G06F 3/0414 | 345/173 |
| 2016/0147363 A1 * | 5/2016 | Seto | G06F 3/0416 | 345/173 |

* cited by examiner

METHOD AND APPARATUS TO REDUCE DISPLAY LAG OF SOFT KEYBOARD PRESSES

CROSS-REFERENCE TO RELATED APPLICATION

This application claims priority to and the benefit of U.S. Patent Application No. 61/843,890, filed on Jul. 8, 2013, the entire content of which is incorporated herein by reference.

FIELD

Embodiments of the present invention relate to a data-processing device for displaying a virtual keyboard.

BACKGROUND

In recent years, touchscreen devices have become commonplace as personal mobile devices, such as mobile phones, tablets, laptops, and the like have gained in popularity. In addition to portable devices, touchscreens are being used in industry and in places such as cars and kiosks where keyboard-and-mouse systems do not allow fast, intuitive, or accurate interaction by the user with a display's content.

Touchscreen displays recognize user input by, for example, sensing touching (or tapping) of the screen, or by sensing a user's fingers or hand gestures in close proximity to the touchscreen. A touchscreen may be any surface onto which an image is projected, and from which a touch can be sensed. Touchscreens often employ virtual keyboards (or soft keyboards), which have virtual keys that are represented as specific areas of the touchscreen, rather than physical keys. When a user touches a virtual key on a screen, the touch system detects the touch, and then signals the system processor to update the appearance of the virtual keyboard to indicate to the user that the key touch/press has been registered, for example, by showing a highlighted or enlarged image of the virtual key. However, because the system processor also manages the other processes of the device (e.g., running the device's operating system and many other applications), response time required to update the appearance of the virtual keyboard can be slow, and there may be a noticeable lag between the time the user touches a key and the time that a visual feedback to the key press is provided to the user.

SUMMARY

Accordingly, aspects of embodiments of the present invention provide a method and apparatus for efficient perceived response time of the display of a display device (e.g., a touchscreen device), provide such a method and apparatus that do not require changes to an existing processor and/or operating system, and provide such functionality that may be modified and/or enabled/disabled by application software.

Aspects of embodiments of the present invention are directed to a method and system for providing a feedback (e.g., visual feedback) in response to a user's selection of a virtual key of a display device. Further, aspects of embodiments of the present invention are directed to providing a user-perceived nearly instantaneous response by reducing the time lag from the time a virtual key of a display device is pressed to when the screen of the display device displays the response to the press.

According to embodiments of the present invention, there is provided a method of indicating a selected at least one of keys on a displayed keyboard of a display device, the displayed keyboard having a keyboard layout including a plurality of keys, the method including: identifying the selected at least one of the keys based on a location of the selected at least one of the keys on the displayed keyboard of the display device; updating a rendered video frame with a stored image of the selected at least one of the keys to generate an updated video frame indicating the selection of the at least one of the keys for displaying by the display device, the stored image of the selected at least one of the keys corresponding to the selected at least one of the keys; and while another video frame indicating the selection of the at least one of the keys is being rendered, displaying the updated video frame by the display device.

The method may further include identifying a keyboard template corresponding to the keyboard layout based on input from an application software before identifying the selected at least one of the keys.

The identifying the keyboard template may include: identifying a stored keyboard template corresponding to the keyboard layout; and generating the keyboard template by one or more of scaling or rotating the stored keyboard template.

The stored image of the selected at least one of the keys may include a segment of the keyboard template corresponding to the selected at least one of the keys.

The method may further include displaying the another video frame by the display device after a set time has passed or after detecting a change to the keyboard layout.

The detecting the change to the keyboard layout may include determining that a current rendered video frame does not correspond to the keyboard template.

The detecting the change to the keyboard layout may include identifying a subsequent selection of at least one of the keys.

The identifying the selected at least one of the keys may include: detecting a location of the selected at least one of the keys on the displayed keyboard of the display device; and changing at least one entry of a keyboard mask corresponding to the location of the selected at least one of the keys, wherein the keyboard mask includes a plurality of entries including the at least one entry, the plurality of entries corresponding to the plurality of keys, each of the plurality of entries including a binary 1 or a binary 0.

The stored image of the selected at least one of the keys may include a segment of the keyboard template corresponding to the changed at least one entry of the keyboard mask.

The updating of the rendered video frame may be performed utilizing a keyboard template and a keyboard mask indicating the selection of the at least one of the keys.

The updating of the rendered video frame may be performed based on the keyboard template and a keyboard mask including a plurality of binary entries corresponding to the plurality of keys and indicating the selection of the at least one of the keys.

The selected at least one of the keys may include a functional key for prompting the display device to change from the keyboard layout of the displayed keyboard to a second keyboard layout.

The method may further include: identifying a second selection of at least one of the keys; and receiving a second keyboard template corresponding to the second keyboard layout from an application software.

The method may further include: determining that a current video frame does not correspond to the keyboard layout; and receiving a second keyboard template corresponding to the second keyboard layout from an application software.

The updating the rendered video frame may include substituting pixels of the rendered video frame corresponding to the selected at least one of the keys with pixels of the stored image of the selected at least one of the keys.

The updating the rendered video frame may include blending pixels of the rendered video frame corresponding to the selected at least one of the keys with pixels of the stored image of the selected at least one of the keys.

The identifying the selected at least one of the keys and updating of the rendered video frame may occur within a time span of a single video frame.

The method may further include receiving the rendered video frame from a graphics processor external to the display device.

The identifying the selected at least one of the keys may include identifying the location of the selected at least one of the keys by a touch sensor.

The displayed keyboard may be a keyboard projected onto a surface.

According to embodiments of the present invention, there is provided a display device for indicating a selected key on a displayed keyboard, the displayed keyboard having a keyboard layout and including a plurality of keys, the display device including: a display unit configured to display a video frame depicting the displayed keyboard; a processor; and a memory having instructions stored thereon that, when executed by the processor, cause the processor to perform, in response to selection of at least one of the keys: identifying the selected at least one of the keys based on a location of the selected at least one of the keys on the displayed keyboard of the display device; updating a rendered video frame with a stored image of the selected key to generate an updated video frame indicating the selection of the at least one of the keys, the stored image of the selected key corresponding to the selected at least one of the keys; and while another video frame indicating the selection of the at least one of the keys is being rendered, outputting the updated video frame to the display unit for displaying of the updated video frame.

The executed instructions may further cause the processor to perform: identifying a keyboard template corresponding to the keyboard before identifying the selected at least one of the keys; and displaying the another video frame by the display device after a set time has passed or after detecting a change to the keyboard layout.

The detecting the change to the keyboard layout may include determining that a current rendered video frame does not correspond to the keyboard template.

The detecting the change to the keyboard layout may include identifying a subsequent selection of at least one of the keys.

The updating the rendered video frame may include substituting pixels of the rendered video frame corresponding to the selected at least one of the keys with pixels of the stored image of the selected key.

The updating the rendered video frame may include blending pixels of the rendered video frame corresponding to the selected at least one of the keys with pixels of the stored image of the selected key.

The identifying the selected at least one of the keys and updating of the rendered video frame may occur within a time span of a single video frame.

The identifying the selected at least one of the keys may include identifying the location of the selected at least one of the keys by a touch sensor.

According to embodiments of the present invention, there is provided a touch-sensitive display device for indicating a selected key on a displayed keyboard, the displayed keyboard having a keyboard layout and including a plurality of keys, the touch-sensitive display device including: a display unit configured to display the keyboard; a touch sensor configured to detect, in response to selection of at least one of the keys on the displayed keyboard, a location of the selected at least one of the keys; a processor; and a memory having instructions stored thereon that, when executed by the processor, cause the processor to perform: receiving the location of the selected at least one of the keys from the touch sensor; identifying the selected at least one of the keys based on the location of the selected at least one of the keys; updating a rendered video frame with a stored image of the selected key to generate an updated video frame indicating the selection of the at least one of the keys, the stored image of the selected key corresponding to the selected at least one of the keys; and while another video frame indicating the selection of the at least one of the keys is being rendered, outputting the updated video frame to the display unit for displaying of the updated video frame.

The executed instructions may further cause the processor to perform receiving the rendered video frame from a graphics processor external to the display device.

BRIEF DESCRIPTION OF THE DRAWINGS

The accompanying drawings, together with the specification, illustrate example embodiments of the present invention, and, together with the description, serve to explain the principles of the present invention.

DETAILED DESCRIPTION

Figure 1:
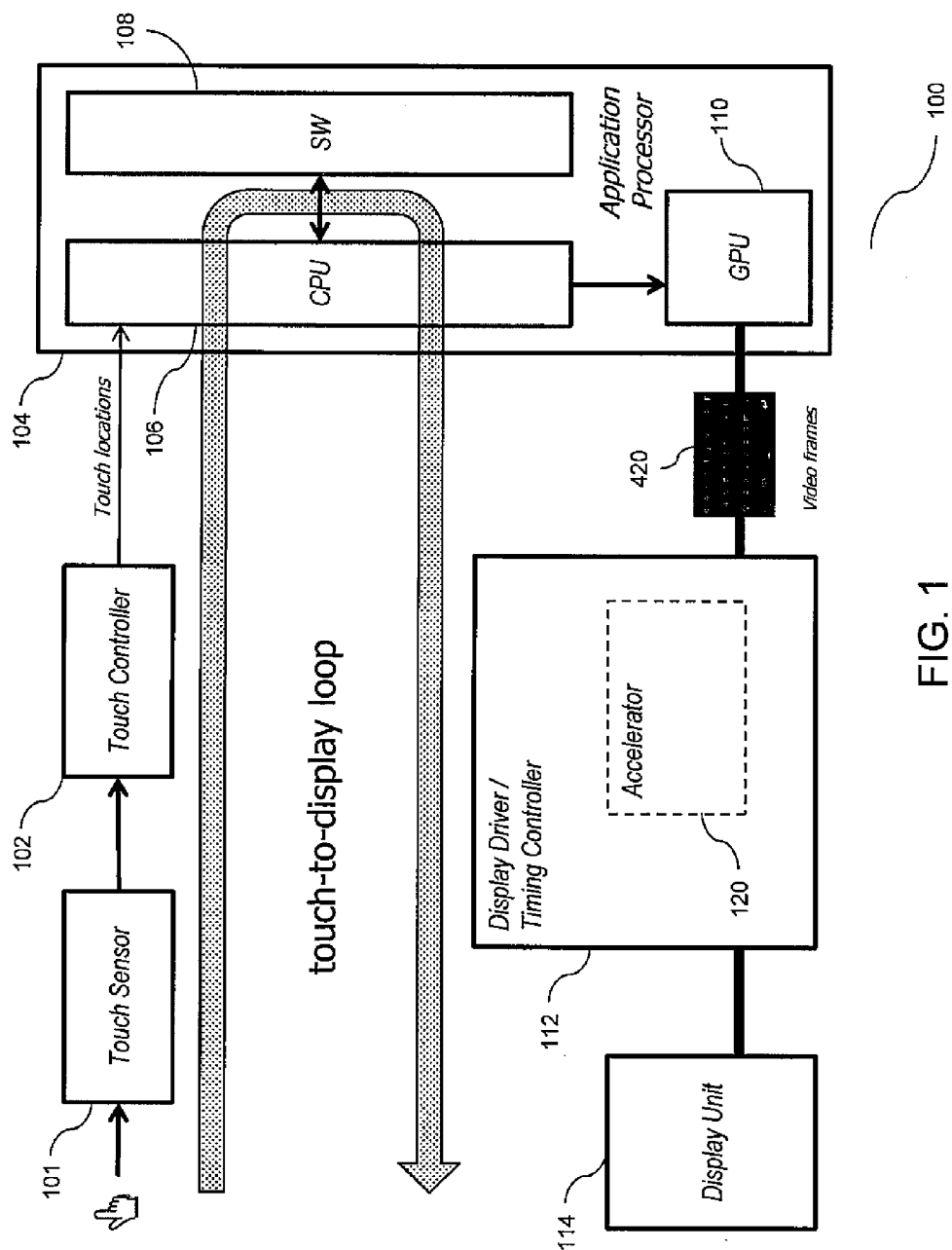
FIG. 1 is a schematic block diagram of a data processing device for accepting user input from a virtual keyboard, and for updating an appearance of the virtual keyboard to provide visual feedback to the user, according to some example embodiments of the present invention.

In the following detailed description, only certain example embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

FIG. 1 is a schematic block diagram of a data processing device 100 for accepting user input (e.g., a user selection) from a virtual keyboard, and for updating an appearance of the virtual keyboard to provide visual feedback to the user, according to an example embodiment of the present invention.

According to the present embodiment, a data processing device 100 includes a touch sensor 101, a touch controller 102, an application processor (AP) 104, a display driver (also referred to as a timing controller) 112, a display unit 114, and an accelerator 120. In embodiments of the present invention, the display driver 112 may be integrated with the touch controller 102. The AP 104 may include a central processing unit (CPU) 106, application software (SW) 108, and a graphical processing unit (GPU) 110. The accelerator 120 may be implemented as a separate component, or may be integrated into any one of the touch controller 102, AP 104, and/or the display driver 112. For example, FIG. 1 depicts an embodiment in which the accelerator 120 is integrated with the display driver 112.

According to example embodiments of the present invention, a display device includes one or more suitable components of the data processing device 100 described above, as those skilled in the art would appreciate. For example, the display device may include the display unit 114 and the accelerator 120, and may further include one more of the touch sensor 101, the touch controller 102, the AP 104, and the display driver 112.

The touch sensor (e.g., a touch screen) 101 detects a user selection (e.g., a user touch or gesture), and sends corresponding signals to the touch controller 102. According to embodiments of the present invention, a user selection may include a physical contact between a display surface and a user's finger(s), a stylus, and/or the like, or may include a user's hand gesture within close proximity of the display surface. The display surface may include a surface on which an image is displayed or projected (such as a display panel of a smart phone or tablet, or a table top onto which an optical virtual keyboard image is projected).

The touch controller 102 processes the signals received from the touch sensor 101, and outputs signals corresponding to the user selection event (e.g., user touch event), which may include coordinates of the selection location (e.g., touch location), to the application processor 104. The AP 104 processes the selection event, and the SW 108 running on the CPU 106 updates the display composition (e.g., information to be displayed by the display unit 114) accordingly. The GPU 110 processes the display composition and renders appropriate video frames (e.g., images to be displayed; a keyboard portion 420 of which is shown in FIG. 1) to transmit to a display driver interface (DDI) controller within the display driver 112. The DDI controller, in turn, processes the video frames from the GPU 110 and outputs driving signals (e.g., pixel driving signals or image projection signals) to the display unit (e.g., a display panel or an optical projector) 114.

Without the use of the accelerator 120 of the present embodiment, because of the long path from the selection input (e.g., touch input) to the display output, a user may perceive a noticeable delay between the time of a key selection (e.g., a virtual keyboard press) and the time that the display provides a feedback (e.g., by displaying a highlighted key corresponding to a pressed key). This latency of the touch-to-display loop (also referred to as a touch-to-display lag or selection-to-display lag) may, for example, be about 100 ms or longer, which may be perceived by a user. Part of this delay caused by the touch-to-display lag may be attributed to the response time of the touch sensor 101 and the processing time of the touch controller 102, which is deterministic, and which may be about 20 ms or less. Furthermore, part of the delay may be attributed to the processing time of the AP 104, which is non-deterministic (e.g., about 60 ms to about 100 ms) as the CPU 106, at any given time, may or may not be busy running one or more higher priority processes.

By using an accelerator 120, embodiments of the present invention allow for a faster virtual keyboard response by displaying, for example, an image of the pressed key, which is stored in memory, before the GPU 110 has time to render the updated video frames. According to an embodiment of the present invention, the stored images can be programmed by software application. In an embodiment of the present invention, this functionality may be enabled and/or disabled via the application software.

Figure 2:
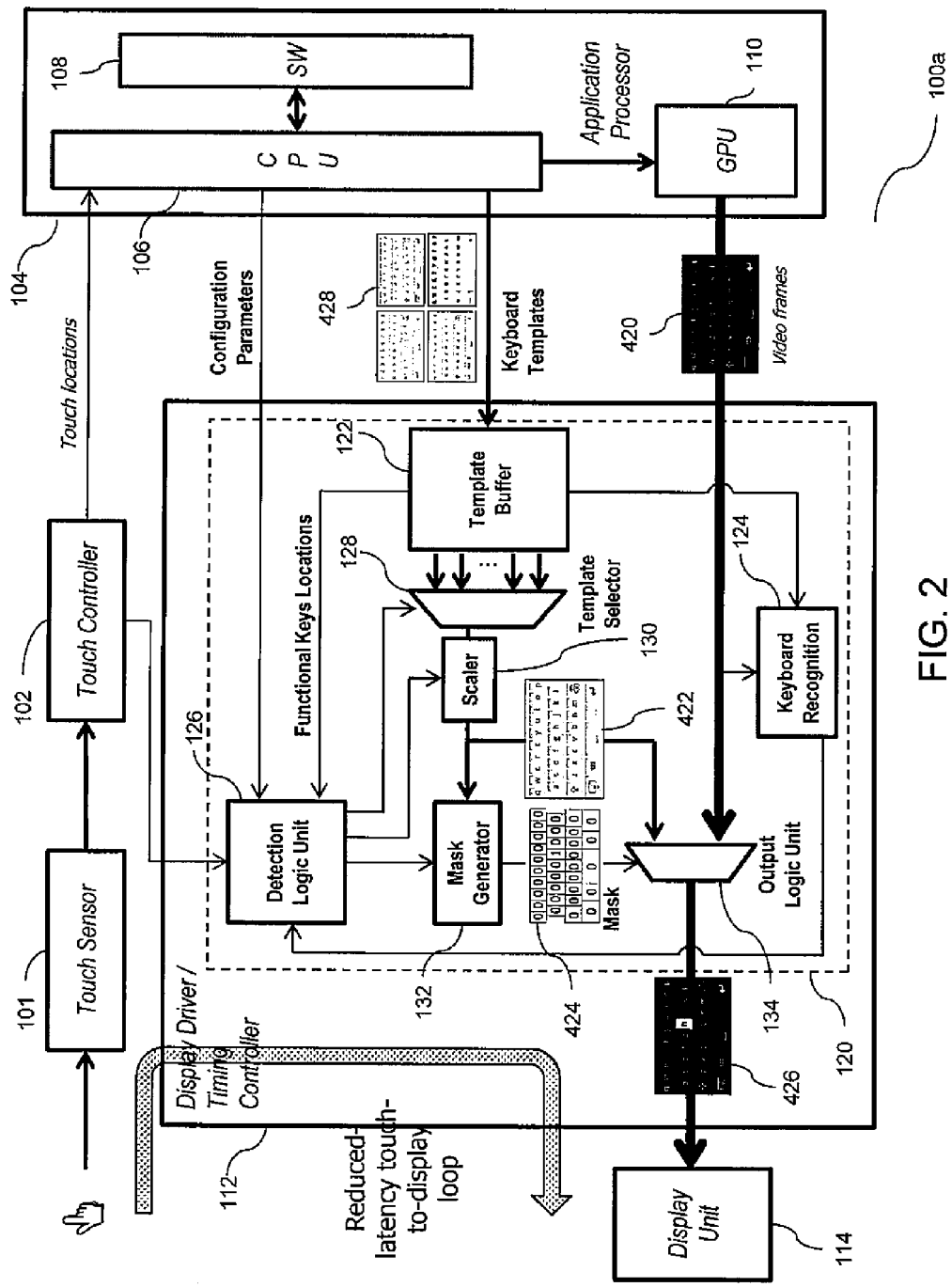
FIG. 2 is a schematic block diagram of a data processing device using an accelerator for reducing a user-perceived time lag between a virtual keyboard press and a visual response to the press, according to some example embodiment of the present invention.

FIG. 2 is a schematic block diagram of a data processing device 100a using an accelerator 120 for reducing a lag between a virtual keyboard press and a visual response to the press, according to an example embodiment of the present invention.

According to one embodiment of the present invention, the accelerator 120 may be integrated with the display driver 112. In one embodiment, the accelerator 120 may include a template buffer 122, a keyboard recognition unit 124, a detection logic unit 126, a template selector 128, a scaler 130, a mask generator 132, and an output logic unit 134.

The template buffer 122 may store a number of keyboard templates 428, each including images of highlighted virtual keys and corresponding to a keyboard layout, which is an arrangement of virtual keys on the device display screen or on a projection surface. For example, a standard English keyboard used in mobile devices has four keyboard layouts: a layout for lower-case letters, a layout for upper-case letters, a layout for numbers and common symbols (such as "@," "&," "#," "%," and/or the like), and a layout for less-common symbols (such as "[," "]," "<," ">," "?," and/or the like). The template buffer 122 may store keyboard templates 428 corresponding to the four standard layouts described above. The images of the highlighted virtual keys may be, for example, colored, color-inverted, and/or enlarged images of the virtual keys when compared to the virtual keys when depicted in a non-depressed state.

In one embodiment of the present invention, the keyboard templates 428 include 1:1 mappings of the screen representations of the virtual keyboard for various orientations and zoom levels of the display. In another embodiment, the keyboard templates 428 are stored as scaled representations of the virtual keyboard in one or more orientations to reduce or minimize memory usage. According to an embodiment of the present invention, the keyboard templates 428 are provided by the SW 108 and/or other software applications, and can be changed and updated through software.

The template buffer 122 may also store the locations of the functional keys on the display screen/surface for each keyboard template 428. A functional key may be a standard or character key that has a function associated with it beyond that of inputting a letter, character, number, symbols, etc. In an example embodiment, pressing a functional key changes the layout of the virtual keyboard. For example, pressing a functional key, such as "123," may cause the display to change from a keyboard layout for lower-case letters to a keyboard layout for numbers and common symbols, and may result in changing the current keyboard template 428 to a corresponding stored keyboard template 428. According to one embodiment of the present invention, the template buffer 122 provides the locations of functional keys (e.g., "Functional Keys Locations" shown in FIG. 2) for all stored keyboard templates 428 to the detection logic unit 126.

The keyboard recognition unit 124 compares the images in specific areas of a video frame (e.g., keyboard portion 420 of a video frame depicting a keyboard) to the stored keyboard templates 428, which it receives from the template buffer 122. The comparison by the keyboard recognition unit 124 may be performed for every video frame, or may be performed at regular frame intervals. If a match is found, then the keyboard recognition unit 124 determines that a virtual keyboard has been activated (e.g., a virtual key has been selected) on the display screen/surface. The keyboard recognition unit 124 also tracks the displayed keyboard layout and recognizes if the displayed keyboard layout has changed (e.g., if the layout of the keyboard has changed from lower-case letters to numbers and common symbols).

The detection logic unit 126 receives display configuration parameters (e.g., "Configuration Parameters" shown in FIG. 2) from the AP 104. The display configuration parameters may include information on the state of the display such as keyboard activation (i.e., whether or not a virtual keyboard is being displayed), screen size, screen orientation, level of zoom, and/or the like.

The detection logic unit 126 monitors the output of the keyboard recognition unit 124 and the configuration parameters sent by the AP 104, and if either indicates an active keyboard (e.g., the virtual keyboard is displayed), the detection logic unit 126 processes the instantaneous selection events (e.g., touch events) from the touch controller 102.

Based on the screen size and the screen orientation, as indicated by the configuration parameters received from the AP 104, and based on the information regarding the location of the functional keys received from the template buffer 122, the detection logic unit 126 may determine whether or not the selection event (e.g., a first user selection) initiates a keyboard template change. A keyboard template change may alternatively be signaled by the keyboard recognition unit 124, which may recognize a keyboard layout change from the video frame output from the GPU 110, or may be recognized by the detection logic unit 126 upon detection of a further selection event (e.g., detection of a second selection or a second key press by the user).

When the initiation of a keyboard template change is determined by the detection logic unit 126, the detection logic unit 126 commands the template selector 128 to change the selected keyboard template 428 to an appropriate keyboard template, and commands the scaler 130 to size the selected keyboard template 428 according to the configuration parameters such that the size corresponds to the current screen size, orientation, and/or zoom level. In some example embodiments, the scaler 130 may also orient and/or rotate the keyboard template.

Upon identifying a selection event (e.g., a touch event), the detection logic unit 126 provides the selection location (e.g., the touch location) to the mask generator 132. Based on the selection location (e.g., touch location) from the detection logic unit 126, and based on the scaled keyboard template 422 from the scaler 130, the mask generator 132 generates a keyboard mask 424 (e.g., updates an existing keyboard mask 424) to indicate the locations of the pixels of the video frames (e.g., the keyboard portion 420 of the video frames) that are to be altered (e.g., to be highlighted, or to have a corresponding inverted-color image displayed thereover). The keyboard mask 424 may include entries corresponding, in location, to each of the keys in the scaled keyboard template 422. The entries may be, for example, in the form of "1"s and "0"s. A "1" may indicate that a corresponding key has been selected (e.g., touched or pressed), and a "0" may indicate no activity on the corresponding key.

As the output logic unit 134 processes each pixel of the incoming video frame from the GPU 110, the output logic unit 134 performs a substitution and/or blending of the video data from the GPU 110 with the template data from the scaler 130 according to entries, for example, "1"s, in the keyboard mask 424.

In an embodiment of the present invention in which substitution of the video data from the GPU 110 with the template data from the scaler 130 is performed, the operation of outputting from the output logic unit 134 can be specified using a single bit defined by the entries in the keyboard mask 424. For example, a "0" may indicate outputting video data rendered by the graphics processor (e.g., the GPU 110) and a "1" may indicate outputting template data.

In an embodiment in which the output logic unit 134 performs a blending operation by blending the video data and the template data, the output operation can be specified using multiple bits (as opposed to a single "0" or "1") as defined by the entries in the keyboard mask 424. The output logic unit 134 may perform various operations on the video data of the video frames based on the template data received from the scaler 130. Such operations may include, for example, edge-blending, anti-aliasing, enhancing (or increasing) contrast, adjusting transparency, and/or the like.

The detection logic unit 126 has an internal timer that controls the duration of each keyboard mask 424. In one example embodiment, the duration of a keyboard mask 424 may represent the amount of time for which an updated entry (e.g., a "1") persists in a keyboard mask 424 before being switched back, by the mask generator 132, to its default value (e.g., a "0"). In other embodiments, the duration of the keyboard mask may be controlled according to any suitable process or method known to those skilled in the art. In one embodiment, the duration is set to approximately match/correspond to the latency of the touch-to-display loop (as, e.g., described with reference to FIG. 1). The duration may be configured by using the configuration parameters output by the AP 104. In one embodiment of the present invention, when the internal timer of the detection logic unit 126 expires, the detection logic unit 126 may prompt the mask generator 132 to change an active entry (e.g., a "1") in the keyboard mask 424 to an inactive entry (e.g., a "0").

As a person of ordinary skill in the art will recognize, the functions of the functional blocks of the accelerator 120 discussed above may be merged into one or more units. Further, in some embodiments of the present invention, the accelerator 120 may be integrated with, and located in, the touch controller 102 or the application processor 104. Furthermore, in some embodiments of the present invention, one or more of the functional blocks of the accelerator 120 (e.g., the detection logic 126 and/or the mask generator 132) may be implemented by software or firmware.

Figure 3A:
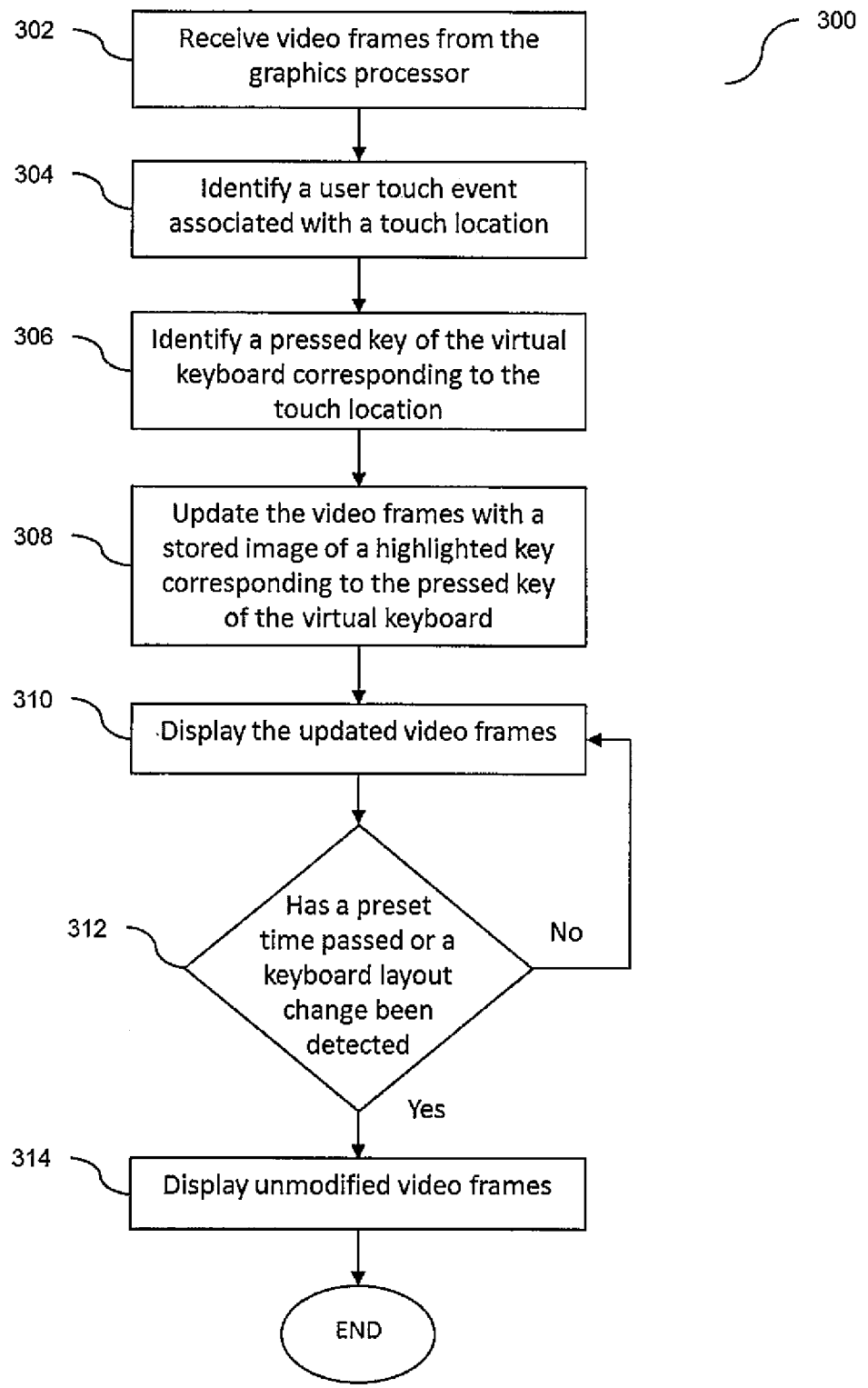
FIG. 3A is a flow diagram of a process of displaying a virtual keyboard by detecting a user selection and providing visual feedback before a graphics processor renders video frames that show a visual feedback, according to some example embodiment of the present invention.

FIG. 3A is a flow diagram of a process 300 of displaying a virtual keyboard by detecting a use selection (e.g., a user key press) and providing visual feedback before a graphics processor (e.g., the GPU 110 shown in FIG. 2) renders video frames showing a visual feedback, according to an example embodiment of the present invention. The process 300 set forth herein will be described in reference to the embodiments of the present invention described above with respect to FIGS. 1 and 2.

In block 302, an accelerator 120 receives video frames (including keyboard portions 420) from a graphics processor. The graphics processor may be a GPU 110 shown in FIG. 2, or may be any processor for rendering video frames displayed by a data processing device 100 (or a display device). A keyboard recognition unit 124 monitors the video frames (e.g., a keyboard portion 420 of the video frames) to determine whether or not a keyboard is active. Upon detection of an active keyboard, the keyboard recognition unit 124 signals a detection logic unit 126 to process the instantaneous selection events (e.g., touch events) from the touch controller 102.

In block 304, the accelerator 120 identifies a user selection event based on an input from a touch controller 102. The touch controller 102 may detect a user selection on the virtual keyboard and transmit information regarding the selection event, along with the location of the selection (e.g., touch), to the detection logic unit 126. If the keyboard recognition unit 124 or the configuration parameters indicate that a keyboard is active and the selection location corresponds to a location of the keyboard, then the detection logic unit 126 determines that a key has been pressed.

In block 306, the accelerator 120 identifies a pressed key of the virtual keyboard corresponding to the selection location. Based on the location of the functional keys received from a template buffer 122 and based on the configuration parameters received from the AP 104, which indicate screen size and screen orientation, the detection logic unit 126 determines if the location of the user selection corresponds to a functional key (e.g., as described above with respect to FIG. 2). In one embodiment, if a functional key press is identified, the detection logic unit 126 signals the template selector 128 to change a current keyboard template 428 to an appropriate template associated with the functional key, and to signal a scaler 130 to scale and rotate the template, based on the configuration parameters, to match the screen size, screen orientation, and/or zoom level.

The detection logic unit 126 provides the selection location (e.g., the coordinates of the touch location) to a mask generator 132. Using the selection location from the detection logic unit 126, and using a scaled keyboard template 422 from the scaler 130, the mask generator 132 updates an entry in a keyboard mask 424 to indicate the locations/coordinates of the pixels, which correspond to the location of the pressed key, and which are to be altered to provide visual feedback to the user.

In block 308, the accelerator 120 updates the video frames (e.g., the keyboard portion 420 of the video frames) with a stored image of a highlighted key corresponding to the pressed key of the virtual keyboard. The video frames are modified (e.g., are updated) when the output logic unit 134 performs an output operation on the pixels of the video frames that correspond to the updated entry in the keyboard mask 424. The output operation may include a pixel-to-pixel substitution of the pixels of the video frame with the pixels of the scaled keyboard templates 422, or a blending of the pixel data of the video frames and the pixel data of the keyboard data templates. For example, the output logic unit 134 may only perform a substitution or a blending operation on pixels of the video frames and scaled keyboard template 422 that correspond to an active mask entry (e.g., a "1").

In block 310, the output logic unit 134 outputs modified (e.g., updated or altered) video frames 426 to the display unit 114. The modified/updated video frames 426 may appear on a display surface, which may, for example, be a touchscreen display or projection surface on which the updated video frames 426 are projected.

In block 312, the detection logic unit 126 checks whether or not an internal timer thereof has lapsed, and whether or not a keyboard layout change is detected. The internal timer of the detection logic unit 126 may be set or preset to equal or approximate an estimated latency of the touch-to-display loop, and/or may be configurable through the configuration parameters received from the AP 104. Upon lapse of the internal timer, the detection logic unit 126 may prompt the mask generator 132 to change the keyboard mask 424 back to its original state (e.g., to change an active entry, such as a "1," in the keyboard mask 424 to an inactive entry, such as a "0"), which may prompt the output logic unit 134 to cease substitution or blending of the pixels of the video frames with those of the scaled keyboard template 422.

A keyboard layout change may be detected in a number of ways. For example, the change may be triggered by the keyboard recognition unit 124, which may monitor specific areas of the video frames (e.g., a keyboard portion 420 of each frame) output from the graphic processor (e.g., the GPU 110) for a change in the keyboard layout to be displayed. The AP 104 may also communicate a keyboard layout change to the detection logic unit 126 using the configuration parameters by, for example, indicating a change in the screen size, orientation, level of zoom, and/or the like.

If neither condition in block 312 is satisfied, as the preset time has not yet lapsed and no keyboard layout change has been detected, the output logic unit 134 may continue to display the modified video frames 426 that it outputted in block 310. However, if the internal timer lapses or if a keyboard layout change is detected in block 312, in block 314, the output logic unit 134 may cease its output operation of outputting modified video frames 426 and may instead output the unmodified video frames received from the graphics processor (e.g., the GPU 110). If a functional key press was detected in block 306, the keyboard template 422 and the associated layout mask 424 may change to an appropriate functional keyboard template and functional layout mask only after a keyboard layout change or a second key press is detected by the detection logic unit 126.

Figure 3B:
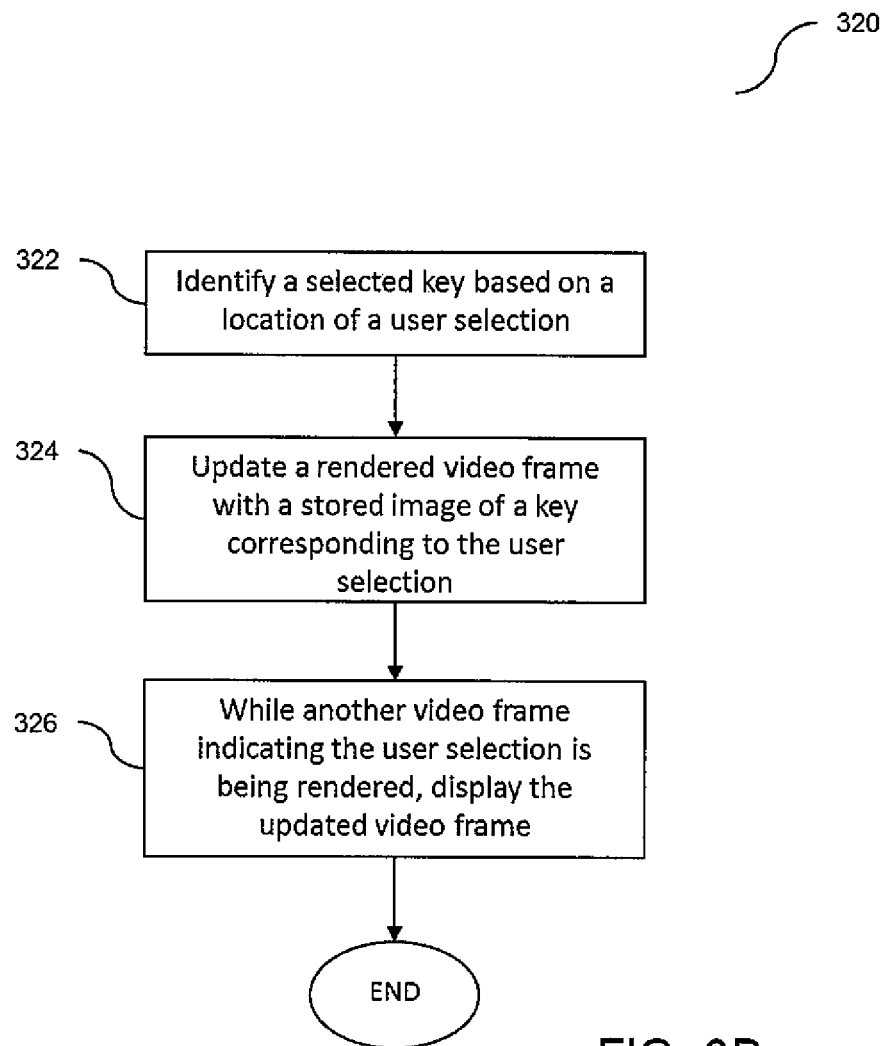
FIG. 3B is a flow diagram of a process of indicating a selected key on a displayed keyboard of a display device in response to detecting a user selection, and displaying the indication before a graphics processor renders video frames indicating the selection, according to some example embodiment of the present invention.

FIG. 3B is a flow diagram of a process 320 of indicating a selected key on a displayed keyboard of a display device in response to detecting a user selection (e.g., a user key press), and displaying the indication (e.g., providing visual feedback) before a graphics processor (e.g., the GPU 110 shown in FIG. 2) renders video frames indicating the selection, according to some example embodiment of the present invention.

The process 320 set forth herein will be described in reference to the embodiments of the present invention described above with respect to FIGS. 1 and 2.

In one example embodiment, the display device includes the accelerator 120 and the AP 104. In other embodiments, the AP 104 may be external to the display device.

The keyboard (e.g., virtual keyboard) displayed by the display device (e.g., displayed on a screen or projected onto a surface) is associated with a keyboard layout and includes a plurality of keys. In response to the user selection (e.g., the selection of at least one of the keys of the displayed keyboard), the display device performs the following, according to an example embodiment of the present invention.

In block 322, the display device (e.g., the accelerator 120) identifies one or more keys corresponding to the selected at least one of the keys based on a location of the selected at least one of the keys on the displayed keyboard of the display device. The user key selection may be sensed (e.g., detected) by the touch sensor 101 and the location of the selection on the displayed keyboard may be determined by the touch controller 102. In an embodiment, the accelerator 120 further receives a rendered video frame 420 from the AP 104 (e.g., the GPU 110).

In an embodiment, the accelerator 120 identifies a keyboard template 422 corresponding to the keyboard layout based on input (e.g., configuration parameters and/or the rendered video frames 420) from the AP 104 before identifying the at least one of the keys. For example, the accelerator 120 may identify a stored keyboard template 428 corresponding to the keyboard layout and generate the keyboard template 422 by one or more of scaling or rotating the stored keyboard template.

In block 324, the display device (e.g., the accelerator 120) updates a rendered video frame 428 with a stored image of the selected key to generate an updated video frame 426 indicating the selection of the at least one of the keys for displaying by the display device, the stored image of the selected key corresponding to the user selection (e.g., the selected at least one of the keys). The stored image of the selected key may include a segment of the keyboard template 422 corresponding to the selected at least one of the keys. In an embodiment, the display device may update the rendered video frame 420 by substituting pixels of the rendered video frame 420 corresponding to the selected at least one of the keys with pixels of the stored image of the selected key. In another embodiment, the display device may update the rendered video frame 420 by blending pixels of the rendered video frame 420 corresponding to the selected at least one of the keys with pixels of the stored image of the selected key.

In block 326, while another video frame 420 indicating the selection of the at least one of the keys is being rendered (e.g., being rendered by the GPU 110), the display device displays the updated video frame by the display device. According to some example embodiments, the display device continues to display the updated video frame 426 until either the another video frame 420 is rendered by the GPU 110, a set time (e.g., about 100 ms) has passed, or the accelerator 120 detects a change to the keyboard layout. The display device may determine that the keyboard layout has changed when, for example, a current rendered video frame 420 does not correspond to the keyboard template 422, or a subsequent selection of a functional key is detected.

According to an embodiment of the present invention, the display device performs features shown in blocks 322 and 324 within a time span of a single video frame.

Figure 4A:
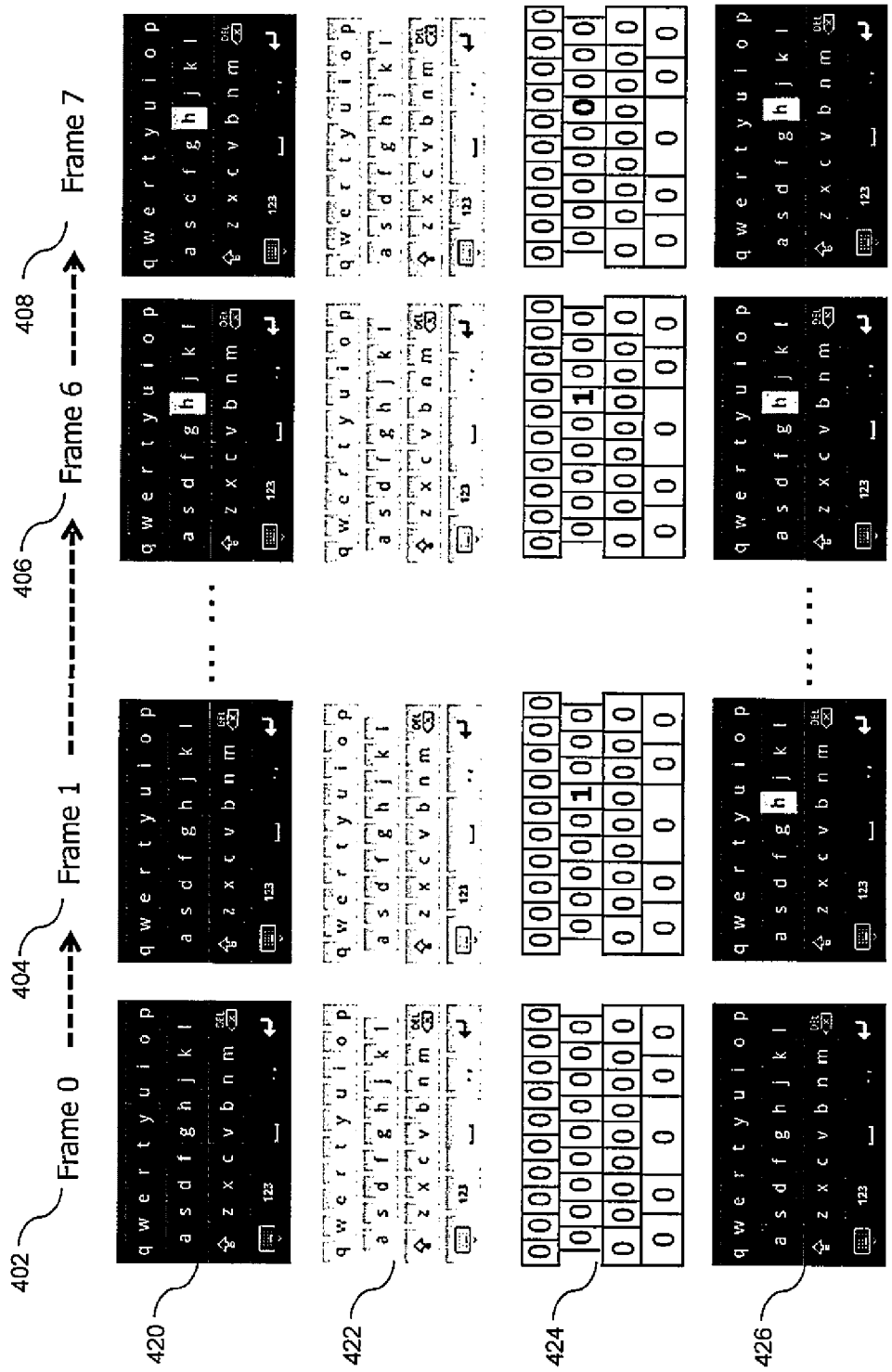
FIG. 4A shows a series of diagrams illustrating the change of a virtual keyboard and a corresponding keyboard template and keyboard mask as caused by a display device responding to a user selection of a non-functional virtual key, according to some example embodiments of the present invention.
Figure 4B:
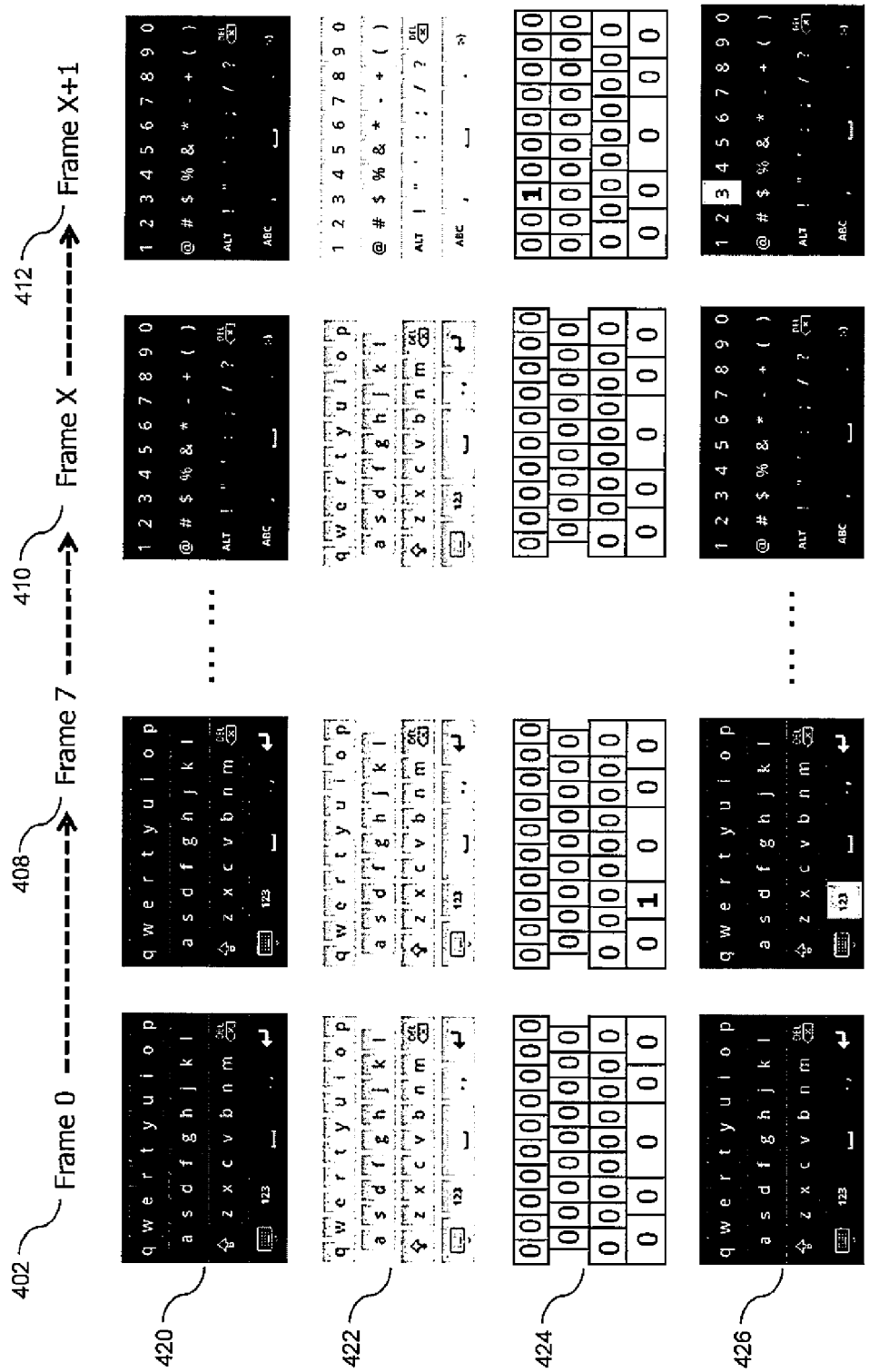
FIG. 4B shows a series of diagrams illustrating the change of a virtual keyboard and a corresponding keyboard template and keyboard mask as caused by a display device responding to a user selection of a functional virtual key, according to some example embodiments of the present invention.

FIGS. 4A and 4B are a series of diagrams (including screen shots) illustrating the change, per frame, of a virtual keyboard and corresponding changes of a keyboard template and a keyboard mask 424 and an output video frame 426, as a display device (e.g., a touch screen device) responds to a user selection (e.g., press or activation) of a virtual key, according to some example embodiments of the present invention. In FIGS. 4A and 4B, input video frame 420 represents a keyboard portion of the video frame produced by a graphics processor (e.g., the GPU 110 shown in FIG. 2) and received by an output logic unit 134; the keyboard template 422 represents a template that is transmitted from a scaler 130 to a mask generator 132 and to the output logic unit 134; the keyboard mask 424 represents the keyboard mask generated by the mask generator 132 and transmitted to the output logic unit 134; and the output video frame 426 represents the keyboard portion of a video frame output by the output logic unit 134 to the display unit 114.

FIG. 4A illustrates examples in which a user selects a non-functional key of the virtual keyboard (e.g., a standard or character key that does not typically have function associated with it beyond that of inputting a letter, character, number, symbols, etc.), according to some example embodiment of the present invention. For example, at time 402, which corresponds to a frame (e.g., Frame 0) of the video frames, a user selects (e.g., touches) a key (e.g., key "h") of the virtual keyboard.

By time 404, which may coincide with the subsequent frame of the video frames (e.g., Frame 1), the mask generator 132 may have updated the keyboard mask 424 (e.g., by changing an entry corresponding to the key "h" from "0" to "1") based on the location of the user selection (e.g., user touch) detected by the touch controller 102 and identified by a detection logic unit 126. Also, by the time 404/Frame 1, the output logic unit 134 may have modified the output video frame 426 using the input video frame 420 and using the keyboard template 422 according to the updated entry of the keyboard mask 424.

Due to the touch-to-display latency, the graphics processor (e.g., the GPU 110 of AP 104 shown in FIG. 2) may not be able to render a virtual keyboard having a highlighted key until time 406, which may coincide with an Nth frame (e.g., Frame 6) of the video frames. At the time 406/Frame 6, the updated keyboard mask 424 may remain unchanged, and the output logic unit 134 may still maintain the same output video frame 426 that was generated at the time 404/Frame 1. By time 408, which may coincide with a subsequent frame (e.g., Frame 7), the internal timer of the detection logic unit 126 may have expired, thereby prompting the detection logic unit 126 to signal the mask generator 132 to change the updated (or active) entry in the keyboard mask 424 back to its original value (e.g., "0"), and prompting the output logic unit 134 to then output the received input video frame 420 to be displayed, and to cease further performing any output operation (such as substitution or blending).

Thus, the accelerator 120 reduces (e.g., significantly reduces) the amount of time required to provide visual feedback to the user in response to a key press. For example, according to the described embodiments of the present invention, the user-perceived visual response lag may be shortened from about six frames (e.g., about 100 ms) to about one frame (e.g., about 17 ms), making the visual response appear nearly instantaneous to the eyes of the user.

FIG. 4B illustrates examples in which the user selects a functional key (as described above with respect to FIG. 2) of the virtual keyboard, according to some example embodiment of the present invention. Upon identifying a functional key press (e.g., a user press of the key "123") at time 402, which may correspond to Frame 0 of the video frame, the accelerator 120 may perform operations, which may be substantially similar to those of the embodiments of the invention described above with regards to FIG. 4A, to display a visual feedback, such as a highlighted functional key, by a time 404 (corresponding to, e.g., Frame 1) and to display the input video frame 420 at the display by time 408 (corresponding to, e.g., Frame 7).

Figure 4C:
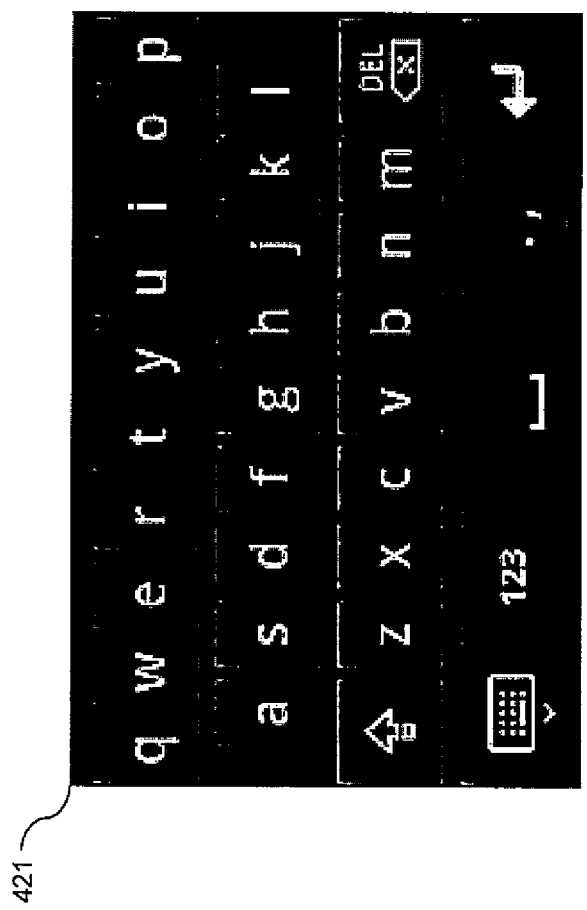
FIG. 4C shows a keyboard layout of the virtual keyboard, according to some embodiments of the present invention.

At a later point in time, an application processor (AP) 104 may update the displayed keyboard layout (which represents an arrangement of keys on the virtual keyboard, as, e.g., represented by the keyboard layout 421 in FIG. 4C) by renderings a new functional keyboard layout, however, the keyboard template 422 and the keyboard mask 424 may remain unchanged until after a time 410, which may correspond to Frame X, when the user either presses a second key (e.g., the number "3"), or when the keyboard layout change is detected by the accelerator 120.

At time 410/Frame X, a detection logic unit 126 may instruct a template buffer 122, a template selector 128, and a scaler 130 to update the keyboard template 422 to match the functional keyboard layout. The detection logic unit 126 may then instruct a mask generator 132 to update the keyboard mask 424 accordingly, and may instruct an output logic unit 134 to update the output video frame 426 using the input video frame 420 and keyboard template 422 in accordance with entries of the keyboard mask 424. At time 412 (corresponding to, e.g., the subsequent Frame X+1), the output logic unit may output the updated output video frame 426 to the display unit 114.

As a person of ordinary skill in the art will recognize, the accelerator 120 may not only provide a fast keyboard response as compared to the AP 104, but may also completely supplant the rendering keyboard response function of the AP 104. For example, in an embodiment of the present invention, the graphics processor (e.g., the GPU 110) may be programmed to not render a visual response to a key press on the virtual keyboard. In such an embodiment, the accelerator 120 may be the only or primary means for providing a visual feedback to a user press of a virtual key.

While this disclosure has been described in connection with what is presently considered to be practical exemplary embodiments of the present invention, it is to be understood that the present invention is not limited to the disclosed embodiments, but, on the contrary, is intended to cover various modifications and equivalent arrangements included within the spirit and scope of the appended claims and their equivalents.

What is claimed is:

1. A method of indicating selected at least one of keys on a displayed keyboard of a display device, the displayed keyboard having a keyboard layout comprising a plurality of keys, the method comprising:
    identifying the selected at least one of the keys based on a location of the selected at least one of the keys on the displayed keyboard of the display device;
    updating a rendered video frame with a stored image of the selected at least one of the keys to generate an updated video frame indicating the selection of the at least one of the keys for displaying by the display device, the stored image of the selected at least one of the keys corresponding to the selected at least one of the keys; and
    while another video frame indicating the selection of the at least one of the keys is being rendered, displaying the updated video frame by the display device,
    wherein the updating the rendered video frame is performed utilizing a keyboard template and a keyboard mask indicating the selection of the at least one of the keys;
    identifying a keyboard template corresponding to the keyboard layout based on input from an application software before identifying the selected at least one of the keys; and
    displaying the another video frame by the display device after a set time has passed wherein upon passing the set time the keyboard mask change back to original state.

2. The method of claim 1, further comprising:
    identifying a keyboard template corresponding to the keyboard layout based on input from an application software before identifying the selected at least one of the keys.

3. The method of claim 2, wherein the identifying the keyboard template comprises:
    identifying a stored keyboard template corresponding to the keyboard layout; and
    generating the keyboard template by one or more of scaling or rotating the stored keyboard template.

4. The method of claim 2, wherein the stored image of the selected at least one of the keys comprises a segment of the keyboard template corresponding to the selected at least one of the keys.

5. The method of claim 2, further comprising:
    displaying the another video frame by the display device after a set time has passed or after detecting a change to the keyboard layout.

6. The method of claim 5, wherein the detecting the change to the keyboard layout comprises determining that a current rendered video frame does not correspond to the keyboard template.

7. The method of claim 5, wherein the detecting the change to the keyboard layout comprises identifying a subsequent selection of at least one of the keys.

8. The method of claim 2, wherein the identifying the selected at least one of the keys comprises:
    detecting a location of the selected at least one of the keys on the displayed keyboard of the display device; and
    changing at least one entry of a keyboard mask corresponding to the location of the selected at least one of the keys,
    wherein the keyboard mask comprises a plurality of entries comprising the at least one entry, the plurality of entries corresponding to the plurality of keys.

9. The method of claim 8, wherein the stored image of the selected at least one of the keys comprises a segment of the keyboard template corresponding to the changed at least one entry of the keyboard mask.

10. The method of claim 1, wherein the updating the rendered video frame is performed utilizing a keyboard template and a keyboard mask indicating the selection of the at least one of the keys.

11. The method of claim 1, wherein the selected at least one of the keys comprises a functional key for prompting the display device to change from the keyboard layout of the displayed keyboard to a second keyboard layout.

12. The method of claim 11, further comprising:
    identifying a second selection of at least one of the keys; and
    receiving a second keyboard template corresponding to the second keyboard layout from a template buffer.

13. The method of claim 11, further comprising:
    determining that a current video frame does not correspond to the keyboard layout; and receiving a second keyboard template corresponding to the second keyboard layout from a template buffer.

14. The method of claim 1, wherein the updating the rendered video frame comprises substituting pixels of the rendered video frame corresponding to the selected at least one of the keys with pixels of the stored image of the selected at least one of the keys.

15. The method of claim 1, wherein the updating the rendered video frame comprises blending pixels of the rendered video frame corresponding to the selected at least one of the keys with pixels of the stored image of the selected at least one of the keys.

16. The method of claim 1, wherein the identifying the selected at least one of the keys and updating of the rendered video frame occurs within a time span of a single video frame.

17. The method of claim 1, further comprising receiving the rendered video frame from a graphics processor external to the display device.

18. The method of claim 1, wherein identifying the selected at least one of the keys comprises identifying the location of the selected at least one of the keys by a touch sensor.

19. The method of claim 1, wherein the displayed keyboard is a keyboard projected onto a surface.

20. A display device for indicating a selected key on a displayed keyboard, the displayed keyboard having a keyboard layout and comprising a plurality of keys, the display device comprising:
a display unit configured to display a video frame depicting the displayed keyboard;
a processor; and
a memory having instructions stored thereon that, when executed by the processor, cause the processor to perform, in response to selection of at least one of the keys:
identifying the selected at least one of the keys based on a location of the selected at least one of the keys on the displayed keyboard of the display device;
updating a rendered video frame with a stored image of the selected key to generate an updated video frame indicating the selection of the at least one of the keys, the stored image of the selected key corresponding to the selected at least one of the keys; and
while another video frame indicating the selection of the at least one of the keys is being rendered, out-putting the updated video frame to the display unit for displaying of the updated video frame,
wherein the updating the rendered video frame is performed utilizing a keyboard template and a keyboard mask indicating the selection of the at least one of the keys;
identifying a keyboard template corresponding to the keyboard before identifying the selected at least one of the keys; and
displaying the another video frame by the display device after a set time has passed wherein upon passing the set time the keyboard mask change back to original state.

21. The display device of claim 20, wherein the executed instructions further cause the processor to perform:
identifying a keyboard template corresponding to the keyboard before identifying the selected at least one of the keys; and
displaying the another video frame by the display device after a set time has passed or after detecting a change to the keyboard layout.

22. The display device of claim 21, wherein the detecting the change to the keyboard layout comprises determining that a current rendered video frame does not correspond to the keyboard template.

23. The display device of claim 21, wherein the detecting the change to the keyboard layout comprises identifying a subsequent selection of at least one of the keys.

24. The display device of claim 23, wherein the updating the rendered video frame comprises substituting pixels of the rendered video frame corresponding to the selected at least one of the keys with pixels of the stored image of the selected key.

25. The display device of claim 20, wherein the updating the rendered video frame comprises blending pixels of the rendered video frame corresponding to the selected at least one of the keys with pixels of the stored image of the selected key.

26. The display device of claim 25, wherein the identifying the selected at least one of the keys and updating of the rendered video frame occurs within a time span of a single video frame.

27. The display device of claim 26, wherein identifying the selected at least one of the keys comprises identifying the location of the selected at least one of the keys by a touch sensor.

28. A touch-sensitive display device for indicating a selected key on a displayed keyboard, the displayed keyboard having a keyboard layout and comprising a plurality of keys, the touch-sensitive display device comprising:
a display unit configured to display the keyboard;
a touch sensor configured to detect, in response to selection of at least one of the keys on the displayed keyboard, a location of the selected at least one of the keys;
a processor; and
a memory having instructions stored thereon that, when executed by the processor, cause the processor to perform:
receiving the location of the selected at least one of the keys from the touch sensor;
identifying the selected at least one of the keys based on the location of the selected at least one of the keys;
updating a rendered video frame with a stored image of the selected key to generate an updated video frame indicating the selection of the at least one of the keys, the stored image of the selected key corresponding to the selected at least one of the keys; and
while another video frame indicating the selection of the at least one of the keys is being rendered, outputting the updated video frame to the display unit for displaying of the updated video frame,
wherein the updating the rendered video frame is performed utilizing a keyboard template and a keyboard mask indicating the selection of the at least one of the keys;
identifying a keyboard template corresponding to the keyboard before identifying the selected at least one of the keys; and
displaying the another video frame by the display device after a set time has passed wherein upon passing the set time the keyboard mask change back to original state.

29. The display device of claim 28, wherein the executed instructions further cause the processor to perform receiving the rendered video frame from a graphics processor external to the display device.

* * * * *